(12) United States Patent
Lim

(10) Patent No.: US 9,411,843 B2
(45) Date of Patent: Aug. 9, 2016

(54) METHOD AND APPARATUS FOR MANAGING AN INDEX IN A SHARED MEMORY

(71) Applicant: Altibase Corp., Seoul (KR)

(72) Inventor: Hyeong Tae Lim, Seoul (KR)

(73) Assignee: Altibase Corp., Seoul (KR)

( * ) Notice: Subject to any disclaimer, the term of this patent is extended or adjusted under 35 U.S.C. 154(b) by 345 days.

(21) Appl. No.: 14/085,575

(22) Filed: Nov. 20, 2013

(65) Prior Publication Data

US 2014/0297650 A1    Oct. 2, 2014

(30) Foreign Application Priority Data

Mar. 29, 2013    (KR) .................. 10-2013-0034694

(51) Int. Cl.
*G06F 7/00* (2006.01)
*G06F 17/30* (2006.01)

(52) U.S. Cl.
CPC ............................. *G06F 17/30336* (2013.01)

(58) Field of Classification Search
None
See application file for complete search history.

(56) References Cited

U.S. PATENT DOCUMENTS

| | | | | |
|---|---|---|---|---|
| 4,819,156 A * | 4/1989 | DeLorme | G06F 11/1471 | 714/15 |
| 5,446,841 A * | 8/1995 | Kitano | G06F 15/167 | 709/213 |
| 5,592,432 A * | 1/1997 | Vishlitzky | G06F 11/3419 | 365/230.03 |
| 5,794,229 A * | 8/1998 | French | G06F 17/30324 | |
| 6,101,525 A * | 8/2000 | Hecker | G06F 9/5016 | 711/E12.009 |
| 6,170,070 B1 * | 1/2001 | Ju | G11C 29/08 | 702/117 |
| 6,237,108 B1 * | 5/2001 | Ogawa | G06F 11/1666 | 714/6.32 |
| 7,082,610 B2 * | 7/2006 | Lal | G06F 9/3861 | 712/10 |
| 8,655,962 B2 * | 2/2014 | Blocksome | G06F 9/544 | 709/205 |
| 8,904,064 B2 * | 12/2014 | Bellows | G06F 13/28 | 710/52 |
| 2003/0061537 A1 * | 3/2003 | Cha | G06F 11/1471 | 714/16 |
| 2004/0015848 A1 * | 1/2004 | Bystedt | G06F 9/4435 | 717/116 |

FOREIGN PATENT DOCUMENTS

| | | |
|---|---|---|
| KR | 100902122 B1 | 10/2008 |
| KR | 1020090095955 A | 9/2009 |
| KR | 10-2012-0082176 A | 7/2012 |
| KR | 1020120082176 A | 7/2012 |
| KR | 101242860 B1 | 1/2013 |

OTHER PUBLICATIONS

Notice of Allowance dated Sep. 20, 2014 corresponding to KR 10-2013-0034694.

* cited by examiner

*Primary Examiner* — Debbie Le
*Assistant Examiner* — Hasanul Mobin
(74) *Attorney, Agent, or Firm* — Kilpatrick Townsend & Stockton LLP

(57) ABSTRACT

The present invention relates to a method of managing an index in a shared memory in a multi-process environment. An apparatus for managing an index in a shared memory is implemented to log an address of an index node where an operation is to be performed, information on a number of slots stored in a slot count unit, and information on moved slots stored in a slot movement count unit.

8 Claims, 7 Drawing Sheets

| | INDEX NODE STATUS | SLOT COUNT | OPERATION |
|---|---|---|---|
| (a) | 1 2 3 4 5 | 5 | |
| (b) | 1 2 4 4 5 | 5 | copy 4 into slot3 |
| (c) | 1 2 4 5 5 | 5 | copy 5 into slot4 |
| (d) | 1 2 4 5 | 5 | remove slot5 |
| (e) | 1 2 4 5 | 4 | decrease slot count |

_US 9,411,843 B2_

METHOD AND APPARATUS FOR MANAGING AN INDEX IN A SHARED MEMORY

CROSS-REFERENCE TO RELATED PATENT APPLICATION

This application claims the benefit of Korean Patent Application No. 10-2013-0034694, filed on Mar. 29, 2013, in the Korean Intellectual Property Office, the disclosure of which is incorporated herein in its entirety by reference.

BACKGROUND OF THE INVENTION

1. Field of the Invention

The present invention relates to a database management system (DBMS), and more particularly, to a method of operating a shared memory index in a multi-process environment.

2. Description of the Related Art

According to the conventional art, any process in a multi-process environment has a stored index. Referring to FIG. 1, a first process 110, a second process 120, and a third process 130 should respectively manage an index, and thus, indexes are redundantly managed.

SUMMARY OF THE INVENTION

The present invention provides a method and apparatus for reducing the amount of memory used and the number of operations needed in operating an index by making all process manage one index by operating an index in a shared memory.

The present invention also provides a method and apparatus for minimizing deterioration of performance of an index operation by reducing the amount of work for restoring a broken index when an index is broken by an abnormal termination while a process modifies an index.

According to an aspect of the present invention, there is provided an apparatus for managing an index in a shared memory, including: a storage unit to store an address of each index node that constitutes the index; a slot count unit to store a number of slots included in the index node; a slot movement count unit to store a number of slots moved in the index node in a process of performing an operation including insertion and deletion; and a restoration unit to restore the index to a state before an abnormal termination of a process occurs based on information stored in the slot count unit and the slot movement count unit when the abnormal termination occurs in the process of performing the operation, wherein the storage unit is implemented to log an address of an index node where the operation is to be performed, information on a number of slots stored in the slot count unit, and information on moved slots stored in the slot movement count unit.

If the operation is insertion, the restoration unit may restore moved slots to an original location based on the number of moved slots stored in the slot movement count unit, and restore the number of slots stored in the slot count unit to a number of slots before the insertion is performed.

If the operation is deletion, the storage unit may additionally log a location of a slot where the deletion is to be performed and an original data value allocated to the slot where the deletion is to be performed.

If the operation is deletion, the restoration unit may restore the slots moved based on the number of moved slots stored in the slot movement count unit, restore the number of slots stored in the slot count unit to the number of slots before the deletion is to be performed, and restore a data value allocated within a slot where the deletion has been performed due to the slot movement to the original data value.

BRIEF DESCRIPTION OF THE DRAWINGS

The above and other features and advantages of the present invention will become more apparent by describing in detail exemplary embodiments thereof with reference to the attached drawings in which:

Figure 4:
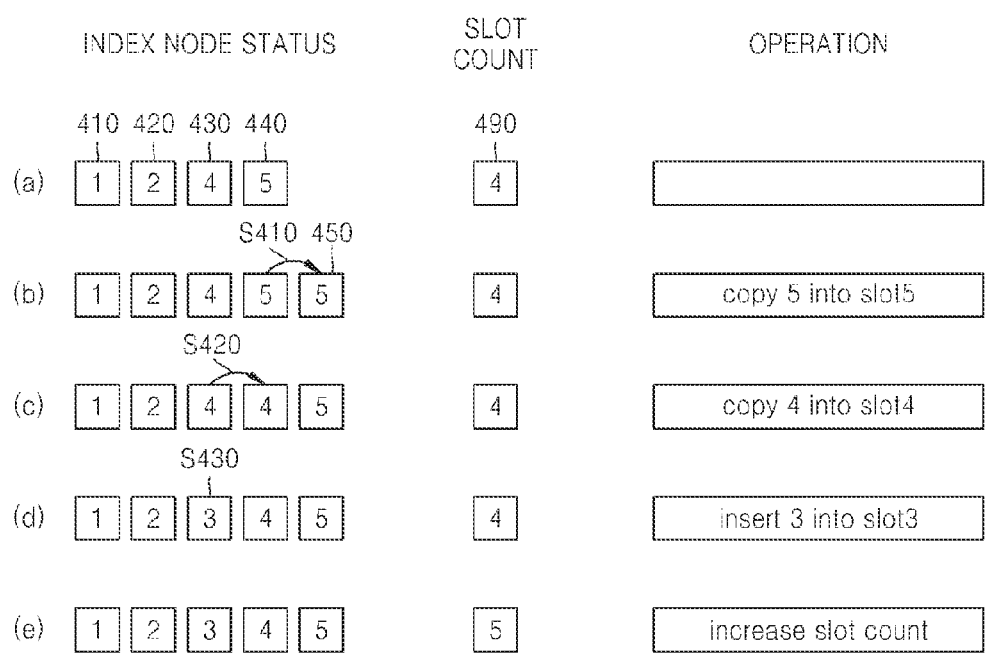

FIGS. 4A to 4E are diagrams illustrating each operation of performing an insertion into an index node in a database management system (DBMS);

FIGS. 5A to 5E are diagrams illustrating a method of managing an index when each process shares an index in a shared memory in a multi-process environment according to an exemplary embodiment of the present invention;

FIGS. 6A to 6E are diagrams illustrating an example of performing a deletion in an index in a shared memory in a DBMS.

DETAILED DESCRIPTION OF THE INVENTION

Hereinafter, a method and system for reducing the amount of undo logs of a shared memory index modification tasks according to the present invention will be described with reference to the attached drawings. Furthermore, the general terms and technical matters which are well known to one of ordinary skill in the art are not explained here.

Figure 1:
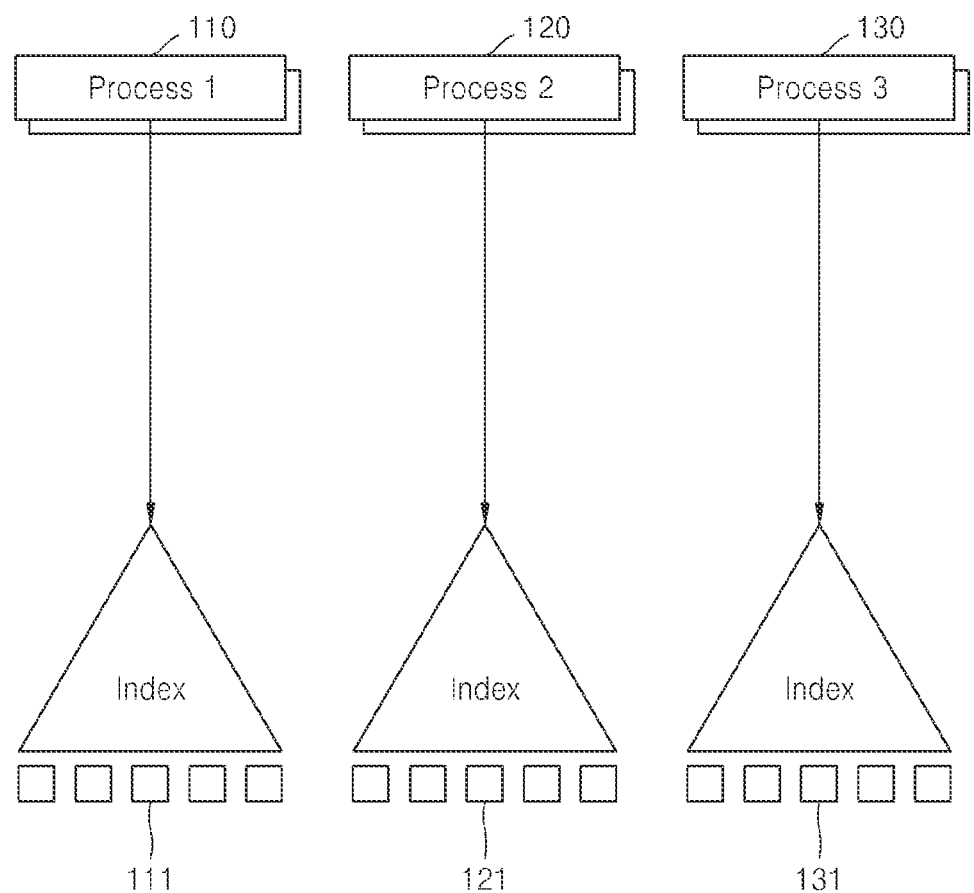
FIG. 1 is a diagram illustrating an example where each process refers to its own index in a multi-process environment.

FIG. 1 is a diagram illustrating an example where each process refers to its own index in a multi-process environment.

FIG. 1 illustrates an example of referring to an index 111 stored in a local memory in a first process 110, referring to an index 121 stored in a local memory in a second process 120, and referring to an index 131 in a local memory in a third process 130. Each index 111, 121 or 131 may include at least one index node. The index node may include at least one slot. The first process 110, the second process 120 and the third process 130 may be implemented as a database management system (DBMS). In this case, the index should be respectively managed in the first process 110, the second process 120 and the third process 130, and thus the index should be redundantly managed.

Figure 2:
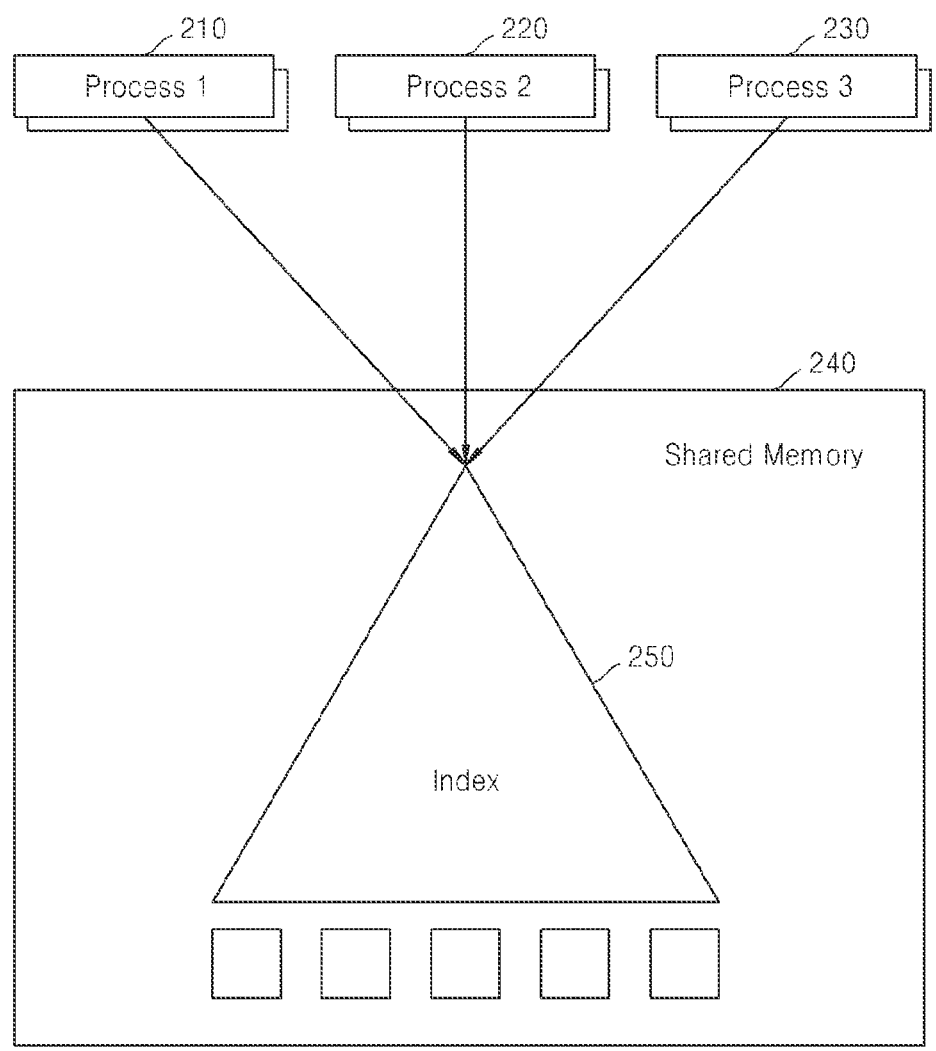
FIG. 2 is a diagram illustrating an example where each process refers to a same index in a shared memory in a multi-process environment.

FIG. 2 is a diagram illustrating an example where each process refers to a same index in a shared memory in a multi-process environment.

FIG. 2 illustrates an example of one index 250 in a shared memory 240 when each process 210, 220 or 230 refers to the same index. In this case, a plurality of processes need only a single index stored in the shared memory.

However, when one of the processes 210, 220, and 230 is abnormally terminated before the operation is completed while updating the index 250, the index 250 in the shared memory 240 may be broken. Hence, logging is required to use the index 250 in the shared memory 240.

The logging scheme may be divided into physical logging and logical logging. The feature of each logging scheme is described below. The physical logging is idempotent, but the performance of the logging scheme may be deteriorated due to the large amount of logs. When the logical logging is used, the amount of logs is reduced, but the logical logging is not idempotent, and thus, caution is required when using the logical logging.

The present invention suggests a restoration method, adapted in an index management apparatus, that shows the same undo result even after performing logging for several times due to idempotence while enhancing the performance of the restoration method by reducing the amount of logs through logical logging.

Figure 3:
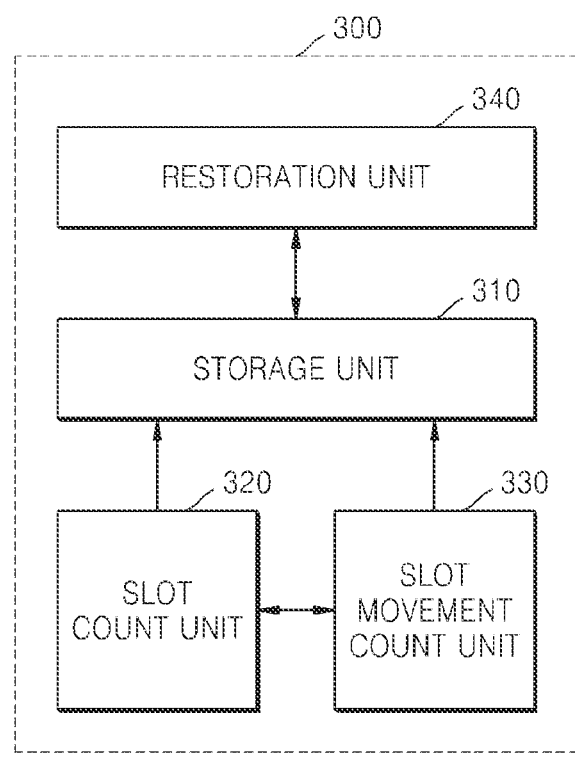
FIG. 3 is an internal configuration diagram of an apparatus for managing an index in a shared memory.

FIG. 3 is an internal configuration diagram of an apparatus for managing an index in a shared memory.

Figure 5:
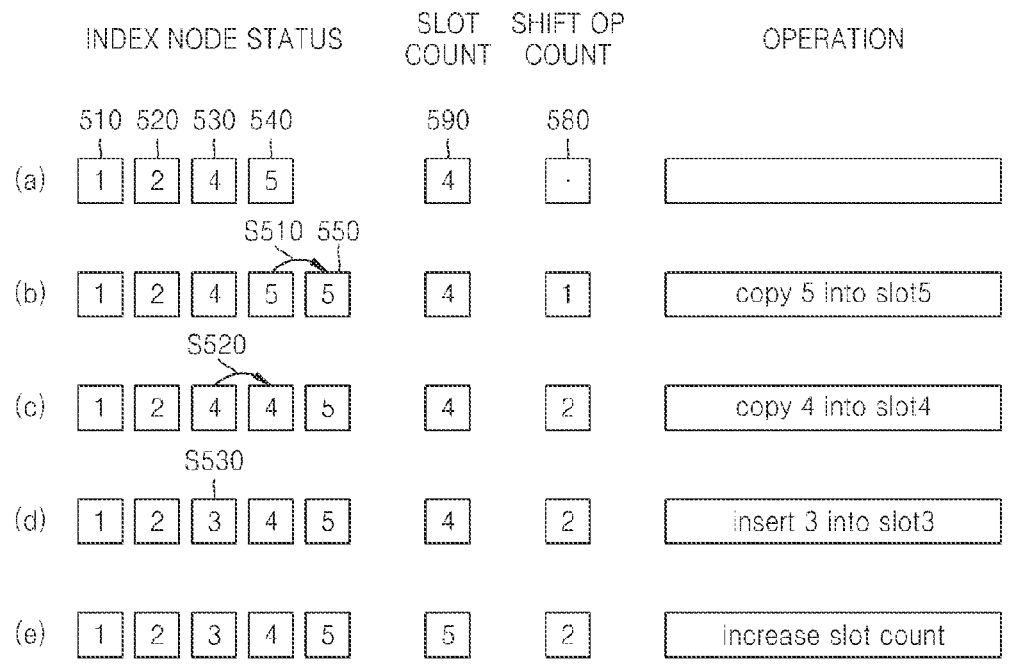
Figure 7:
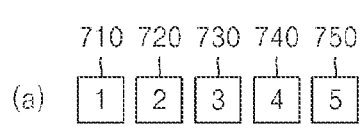
FIGS. 7A to 7E are diagrams illustrating a method where each process performs a deletion in an index node in a shared memory in a multi-process environment, and an example of performing a restoration during the deletion according to an exemplary embodiment of the present invention.

In an exemplary embodiment of the present invention, an index management apparatus 300 may be implemented in the shared memory 240 illustrated in FIG. 2. An example of performing insertion in the index management apparatus 300 is illustrated in FIG. 5, and an example of performing deletion in the index management apparatus 300 is illustrated in FIG. 7.

The index management apparatus 300 includes a storage unit 310, a slot count unit 320, a slot movement count unit 330, and a restoration unit 340.

The storage unit 310 stores the address of each index node that constitutes the index stored in the shared memory. For example, slots illustrated in FIGS. 4A to 4E are stored.

Furthermore, the storage unit 310 is implemented to log the address of an index node where an operation including insertion and deletion is to be performed, information on the number of slots stored in the slot count unit 320 before the operation is performed, and information on the number of moved slots stored in the slot movement count unit 330 in the process of performing the operation.

The slot count unit 320 indicates the number of slots included in the index node. For example, the index node illustrated in FIG. 4A has four slots 410, 420, 430 and 440, and thus the slot count unit 320 (refer to reference numeral 490 of FIG. 4) displays "4".

When the operation including insertion and deletion is performed, the slot movement count unit 330 indicates the number of slots moved in the index node. The slot movement count unit 330 is described later with reference to FIGS. 5 and 7.

If an abnormal termination occurs in the process of performing the operation, the restoration unit 340 is implemented to restore the index to a state before the abnormal termination occurs, based on information stored in the slot movement count unit 330 and the slot count unit 320.

FIGS. 4A to 4E are diagrams illustrating each operation of performing an insertion into an index node in a database management system (DBMS).

Hereinafter, an operation of inserting "3" into an index in a shared memory in the DBMS will be described with reference to FIGS. 4A to 4E. Furthermore, when one of a plurality of processes (e.g., 210, 220 and 230 of FIG. 2) is terminated without completing the insertion while updating the index, the undo process to be processed in each operation is described below.

FIG. 4A illustrates a state of an index before an insertion job is performed. Referring to FIG. 4A, 1 is allocated to a first slot 410, 2 is allocated to a second slot 420, 4 is allocated to a third slot 430 and 5 is allocated to a fourth slot 440, and the value of a slot count 490 is set to 4.

When trying to insert "3" between the second slot 420 and the third slot 430, slots from the last slot (440) to the position (430) slot where an insertion is to be performed are pushed to the right by one slot.

Referring to FIG. 4B, if the insertion job is started, the data value allocated to the fourth slot 440 corresponding to the last slot is copied, and the copied data value is allocated to a newly generated fifth slot 450 (S410). In this case, even if the process is terminated without completing insertion while updating the index, the slot count 490 has not been changed, and thus, there is no operation to be processed.

Thereafter, referring to FIG. 4C, the data value allocated to the third slot 430 is copied, and is then allocated to the fourth slot 440 (S420). In the operation shown in FIG. 4C, if the process is terminated without completing insertion while updating the index, the value allocated to the fourth slot 440 is restored to 5.

Next, referring to FIG. 4D, data value "3" is inserted into the third slot 430 (S430). In the operation shown in FIG. 4D, if the process is terminated without completing insertion while updating the index, the data value of the third slot 430 is changed to the original data value 4, and the value allocated to the fourth slot 440 is restored to 5.

Lastly, referring to FIG. 4E, the slot count 490 is incremented. In the operation shown in FIG. 4E, if the process is terminated without completing insertion while updating the index, the slot count 490 is decremented, the data value of the third slot 430 is changed to the original data value 4, and the value allocated to the fourth slot 440 is restored to 5.

In the operations shown in FIGS. 4A to 4E, in order to perform an undo operation, original value information (e.g., 4) of the slot count 490, number information of the slot intended to be inserted or insertion location information of a slot intended to be inserted (e.g., the third slot 430), and initial location information and initial data information of slots (e.g., 1 is allocated to the first slot 410, 2 is allocated to the second slot 420, 4 is allocated to the third slot 430, and 5 is allocated to the fourth slot 440, etc.) are needed. Furthermore, even if an abnormal termination occurs during the undo operation, the data of the index should be restored without a loss.

When each process shares one index in a shared memory in a multi-process environment, if a certain process is abnormally terminated without completing the operation while updating the index in the shared memory, the index in the shared memory may be broken. An exemplary embodiment of the present invention discloses a method of minimizing overhead to restore the index and restoring an index without breaking it even if an abnormal termination occurs in the restoration process.

In particular, when insertion or deletion is performed, if restoration is necessary due to occurrence of an unexpected termination, etc., the index may be restored using only the minimum logs without logging the entire slot in the index.

That is, according to an exemplary embodiment of the present invention, data that is moved only at the time of performing an operation is used as itself, and only the data changed by insertion, deletion, increment, etc. is logged so that the data is restored to the data within the original slot.

FIGS. 5A to 5E are diagrams illustrating a method of managing an index when each process shares an index in a shared memory in a multi-process environment according to an exemplary embodiment of the present invention. In detail, a configuration of performing an insertion operation in the index node and an embodiment of performing a recovery during the insertion operation are illustrated.

As an embodiment of the present invention, a configuration where each process performs an insertion operation in an index node in a shared memory in a multi-process environment is described below. In order to perform the insertion operation, the address of the node into which data is to be inserted and the number of slots in the node are logged in the shared memory. Furthermore, the value of the slot movement count 580 is initialized to 0 or null.

As an embodiment, the index node illustrated in FIG. 5A includes four slots, and thus the value of the slot count 590 is set to 4 and the value of the slot movement count 580 is set to 0 or null.

In an embodiment of the present invention, logging refers to a configuration of recording logs for data restoration, and logging may also mean logging that is generally used in a database management system (DBMS) field. Furthermore, logging in a shared memory refers to storing logs in a shared memory.

Thereafter, each slot is pushed to the right by one slot, starting from the last slot 540 and ending at the slot 530, where new slot S530 is supposed to be inserted, and the value of the slot movement count 580 is incremented. Thereafter, data is inserted into the slot 530 for insertion. Lastly, the number of slots is increased.

Referring to FIGS. 5A to 5E, FIG. 5A illustrates the status of the index before the insertion job is performed, and 1 is allocated to a first slot 510, 2 is allocated to a second slot 520, 4 is allocated to a third slot 530 and 5 is allocated to a fourth slot 540. The value of a slot count 590 is set to 4. The status of an index before the insertion job is performed as in FIG. 5A is stored in advance in a shared memory. In this case, there is no movement of a slot, and thus, the value of a slot movement count 580 for storing the value of the moved slot count is 0 or null.

Referring to FIG. 5B, if the insertion job is started, the data value allocated to the fourth slot 540 corresponding to the last slot is copied, and the copied data value is allocated to the fifth slot 550 (S510). Furthermore, the value of the slot movement count 580 is increased from 0 to 1. In this case, if the process is terminated without completing insertion while updating the index, the undo operation may be performed by confirming that one last slot has been moved based on the value of the slot movement count 580.

Referring to FIG. 5C, the data value allocated to the third slot 530 is copied, and is allocated to the fourth slot 540 (S520). The value of the slot movement count 580 is increased from 1 to 2. In this case, if the process is terminated without completing insertion while updating the index, the undo operation may be performed by confirming that 2 slots have been moved based on the value of the slot movement count 580.

Next, referring to FIG. 5D, the data value "3" is inserted into the third slot 530 (S530). In FIG. 5D, if the process is terminated without completing insertion while updating the index, it is confirmed that 2 slots have been moved based on the value of the slot movement count 580. In this case, from the slot 540 corresponding to the slot count (e.g., $4^{th}$) to the slot corresponding to the value (e.g., 2) of the slot movement count 580 are moved to the left. Hence, the data value of the third slot 530 is changed to the original data value 4, and the value allocated to the fourth slot 540 is restored to 5.

Lastly, referring to FIG. 5E, the slot count 590 is incremented. In the operation shown in FIG. 5E, if the process is terminated without completing insertion while updating the index, the slot count 590 is decremented, and from the slot 540 corresponding to the decremented slot count (e.g., $4^{th}$) to the slot corresponding to the value (e.g., 2) of the slot movement count 580 are moved to the left.

FIGS. 6A to 6E are diagrams illustrating an example of performing a deletion in an index in a shared memory in a database management system (DBMS).

The deletion procedure is the opposite of the insertion procedure. The procedure of removing the third slot 630 is described below with reference to FIGS. 6A to 6E. Furthermore, if one of a plurality of processes (e.g., 210, 220 and 230 of FIG. 2) is abnormally terminated without completing deletion while updating the index, the undo operation to be processed in each procedure is described below.

FIG. 6A illustrates the state of the index before the deletion operation is performed, and 1 is allocated to a first slot 610, 2 is allocated to a second slot 620, 3 is allocated to a third slot 630, 4 is allocated to a fourth slot 640, and 5 is allocated to a fifth slot 650. The value of the slot count 690 is set to 5.

Referring to FIG. 6B, if the deletion operation is started, data of the fourth slot 640 is copied and allocated to the third slot 630 that is intended to be deleted (S610). In this case, if the process is terminated without completing deletion while updating the index, the data value of the third slot 630 is restored to the original value.

Referring to FIG. 6C, the data of the fifth slot 650 is copied and allocated to the fourth slot 640 (S620). In this case, if the process is terminated without completing deletion while updating the index, the data value of the third slot 630 and the fourth slot 640 is restored to the original value.

Referring to FIG. 6D, the fifth slot 650 is deleted. In this case, if the process is terminated without completing deletion while updating the index, the data value of the fifth slot 650 is restored to the original value, the operations shown in FIGS. 6C and 6B are undone, and the data value of the third slot 630 and the fourth slot 640 are restored to the original value.

Lastly, referring to FIG. 6E, the slot count 690 is decremented. In the operation shown in FIG. 6E, if the process is abnormally terminated without completing deletion while updating the index, the slot count 690 is incremented and the operations shown in FIGS. 6D, 6C and 6B are undone.

FIGS. 7A to 7E are diagrams illustrating a method where each process performs a deletion in an index node in a shared memory in a multi-process environment, and an example of performing a restoration during the deletion according to an exemplary embodiment of the present invention.

In order to perform the undo operation during the deletion operation, the location of each slot, the original value of the data stored in each slot, and slot count information may be stored in the logs in advance and may be restored in the undo process.

In the existing restoration scheme, the physical image value for the current status of the index in the shard memory before the deletion operation is performed may be stored. For example, in the case of the index node illustrated in FIG. 7A, 1 is allocated to a first slot 710, 2 is allocated to a second slot 720, 3 is allocated to a third slot 730, 4 is allocated to a fourth slot 740, and 5 is allocated to a fifth slot 750, and the setting of the value of a slot count 790 as 5 may be stored in a physical image form.

Furthermore, in an exemplary embodiment of the present invention, only a slot to be deleted is implemented to be stored in a physical image form.

In an embodiment of the present invention, each slot is moved to the left by one slot in the deletion operation process, and restoration is started by moving each slot from the position of one slot which is intended to be deleted to the right by using the value of the slot movement count 780 when performing the undo operation.

In an embodiment of the present invention, to perform the undo operation the address of a node to be deleted, the slot count of the node, and the location of the slot to be deleted and the original value of the slot to be deleted are logged in a shared memory.

FIG. 7A illustrates a status of an index before the deletion operation is performed, and 1 is allocated to a first slot 710, 2 is allocated to a second slot 720, 3 is allocated to a third slot 730, 4 is allocated to a fourth slot 740 and 5 is allocated to a fifth slot 750, and the value of the slot count 790 is set to 5.

Referring to FIG. 7B, if the deletion operation is started, the data of the fourth slot 740 is copied and allocated to the third slot 730 intended to be deleted (S710). In this case, the data of the fourth slot 740 has been moved to the third slot 730, and thus the value of the slot movement count 780 becomes 1. If the process is terminated without completing deletion while updating the index, the data value of the third slot 730 is restored to the original value by referring to the location of the slot to be deleted, which is logged in the shared memory.

Referring to FIG. 7C, the data of the fifth slot 750 is copied and allocated to the fourth slot 740 (S720). Furthermore, there has been a movement of the slot data, and thus the value of the slot movement count 780 is incremented. In this case, if the process is terminated without completing deletion while updating the index, the fourth slot 740 and the fifth slot 750 are restored by referring to the value of the slot movement count 780, and the third slot 730 is restored to the original value using the data value logged.

Referring to FIG. 7D, the slot to be deleted is the third slot 730, and the fifth slot 750 is not used after the operations shown in FIGS. 7A to 7C, and thus the fifth slot 750 becomes null. In this case, if the process is terminated without completing deletion while updating the index, the slot is moved to the right twice by referring to the value of the slot movement count 780, and the data value of the fourth slot 740 and the fifth slot 750 are restored to the original value. Furthermore, the data value of the third slot 730 stored in the logs of the shared memory is restored to the original value.

Lastly, referring to FIG. 7E, the slot count 790 is decremented. In FIG. 7E, if the process is terminated without completing deletion while updating the index, the slot count 790 is restored to the original value recorded in the log, the third slot 730 and the fourth slot 740 are respectively moved to the right by referring to the value of the slot movement count 780 so that the data values of the fourth slot 740 and the fifth slot 750 are restored to the original values, and the data value of the third slot 730 and the slot count 790 is restored to the original value stored in the log.

The invention can also be embodied as computer readable codes on a non-transitory computer readable recording medium. The non-transitory computer readable recording medium is any data storage device that can store data which can be thereafter read by a computer system. Examples of the non-transitory computer readable recording medium include read-only memory (ROM), random-access memory (RAM), CD-ROMs, magnetic tapes, floppy disks, optical data storage devices, etc. The non-transitory computer readable recording medium can also be distributed over network coupled computer systems so that the computer readable code is stored and executed in a distributed fashion.

According to the present invention, the amount of memory used and the number of operations may be reduced by managing only one index in a multi-process environment, and deterioration of performance by logging may be reduced by minimizing the amount of logs needed in restoration.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for managing an index in a shared memory, the apparatus comprising:
 a storage unit to store an address of each index node that constitutes the index;
 a computer system having a non-transitory memory and executing code stored in the memory;
 a slot count unit to store a number of slots included in the index node;
 a slot movement count unit to store a number of slots moved in the index node in a process of performing an operation including insertion and deletion; and
 a restoration unit to restore the index to a state before an abnormal termination of a process occurs based on information stored in the slot count unit and the slot movement count unit when the abnormal termination occurs in the process of performing the operation,
 wherein the storage unit is implemented by the code executed by the computer system to log an address of an index node where the operation is to be performed, information on a number of slots stored in the slot count unit, and information on moved slots stored in the slot movement count unit.

2. The apparatus of claim 1, wherein, if the operation is insertion, the restoration unit restores moved slots to an original location based on the number of moved slots stored in the slot movement count unit, and changes the number of slots stored in the slot count unit to a number of slots before the insertion is performed.

3. The apparatus of claim 1, wherein, if the operation is deletion, the storage unit additionally logs a location of a slot where the deletion is to be performed and an original data value allocated to the slot where the deletion is to be performed.

4. The apparatus of claim 3, wherein, if the operation is deletion, the restoration unit restores the slots moved based on the number of moved slots stored in the slot movement count unit, restores the number of slots stored in the slot count unit to the number of slots before the deletion is to be performed, and restores a data value allocated within a slot where the deletion has been performed due to the slot movement to the original data value.

5. The apparatus of claim 1, wherein the shared memory is accessed by a plurality of processes and each process is implemented to perform an operation including insertion and deletion in the index.

6. The apparatus of claim 1, wherein, if the operation is insertion, data allocated to each slot is moved to the right from the slot location where the insertion is to be performed to the rightmost slot in the index node.

7. The apparatus of claim 1, wherein, if the operation is deletion, data allocated to a right slot is moved to a left slot from the slot where the deletion is to be performed to the last slot in the index.

8. A method of operating an index in a shared memory, the method comprising:
 storing an address of each index node that constitutes the index in a storage unit;
 recognizing a number of slots included in the index node in a slot count unit;

recognizing a number of slots moved in the index node in a process of performing an operation including insertion and deletion in a slot movement count unit; and restoring the index to a state before an abnormal termination of a process occurs based on information recognized in the slot movement count unit and the slot count unit if the abnormal termination occurs in the process of performing the operation in the restoration unit, wherein the storage unit is implemented to log an address of an index node where the operation is to be performed, information on a number of slots stored in the slot count unit, and information on moved slots stored in the slot movement count unit.

\* \* \* \* \*